Feb. 10, 1970   R. D. GOULD ET AL   3,494,654
TREE SHAKING APPARATUS
Filed July 18, 1968   4 Sheets-Sheet 3

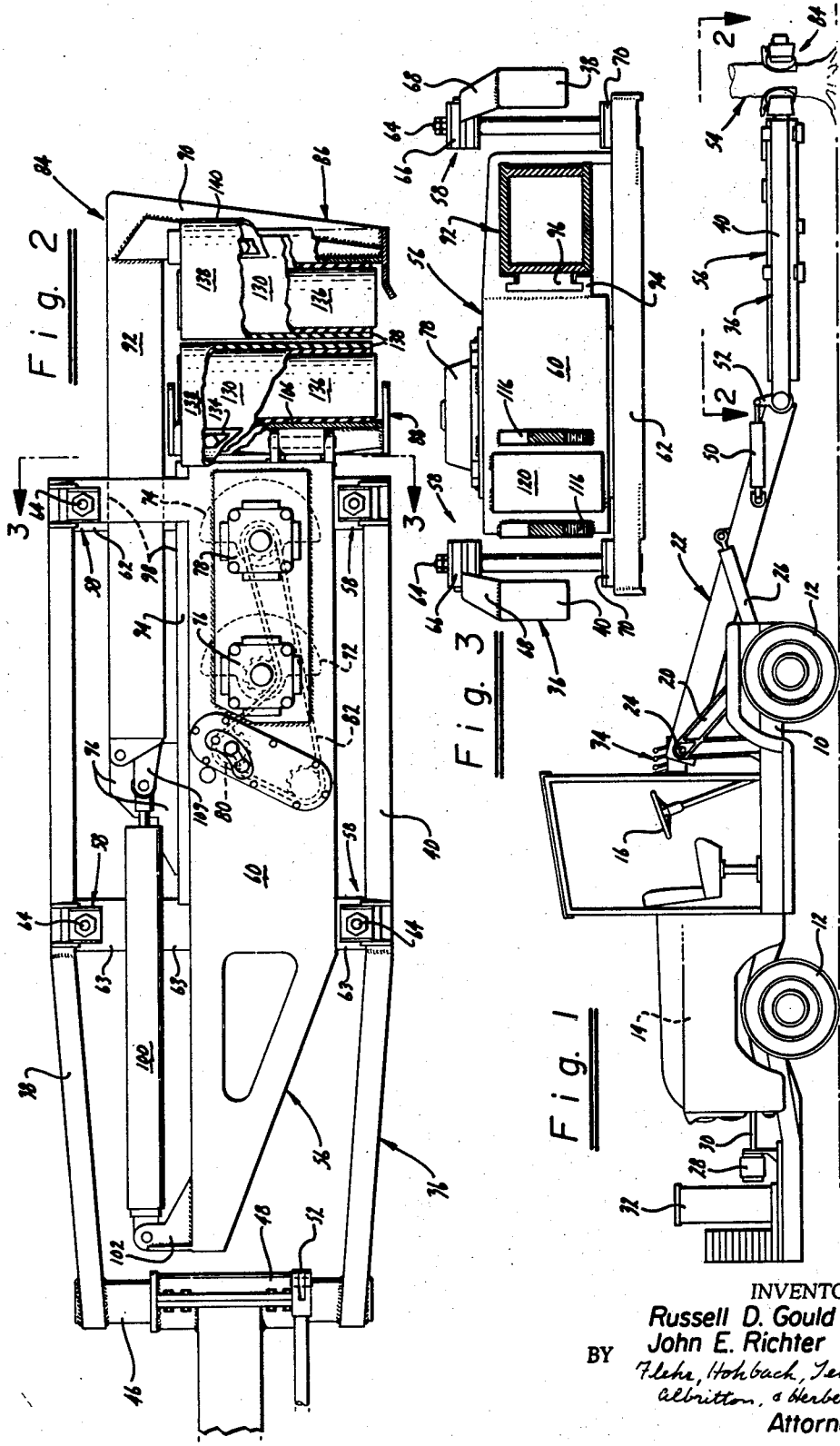

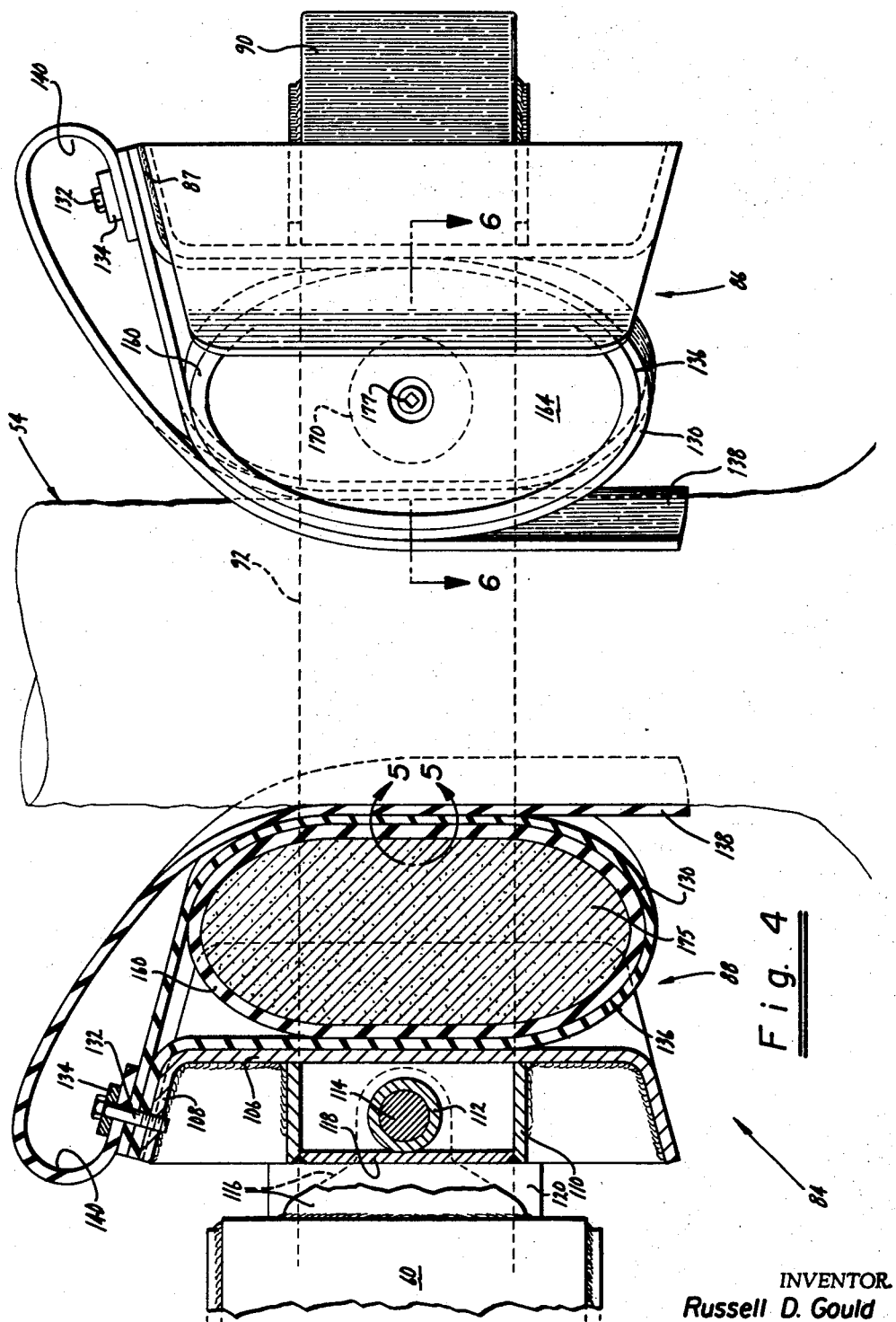

INVENTOR.
Russell D. Gould
BY John E. Richter
Attorneys

Feb. 10, 1970     R. D. GOULD ET AL     3,494,654
TREE SHAKING APPARATUS
Filed July 18, 1968     4 Sheets-Sheet 4

INVENTOR.
Russell D. Gould
John E. Richter
BY Flehr, Hohbach, Test
Albritton, & Herbert
Attorneys United States Patent Office 3,494,654
Patented Feb. 10, 1970

3,494,654
TREE SHAKING APPARATUS
Russell D. Gould, San Jose, and John E. Richter, Santa Clara, Calif.
Continuation-in-part of application Ser. No. 629,810, Apr. 10, 1967. This application July 18, 1968, Ser. No. 745,892
Int. Cl. B66e 1/42; B25b 1/02
U.S. Cl. 294—103                12 Claims

ABSTRACT OF THE DISCLOSURE

A tree shaker including a C-clamp hooking mechanism carrying opposed resilient pads and overlying aprons designed to slide with respect to the pad when shear forces between an apron and pad reach a value below that which would damage the tree being shaken. The pads are sand filled and formed in elliptical shape in lateral cross section.

RELATING APPLICATIONS

This is a continuation-in-part of my copending patent application Ser. No. 629,810, filed Apr. 10, 1967.

BACKGROUND OF THE INVENTION

This invention relates generally to tree shaking machines and more particularly to machines of this type capable of carrying out large scale nut and fruit harvesting operations. In general, such tree shaking machines have an elevatable boom provided with tree or limb engaging members and operate by imparting a shaking motion to the tree member. As disclosed in our copending application entitled "Tree Shaking Apparatus," Ser. No. 519,177, filed Jan. 6, 1966, it is desirable to impart movements to the tree member being shaken which are made of both reciprocatory and gyratory oscillation such that the tree member is both moved backwards and forwards and is rotated slightly. It is, of course, desired to maintain such forces below values which would cause damage to the tree. It is found that one type of damage results from the structure of the tree itself; for, the tree is made up of the central wood and the bark which is connected to the wood by an intermediate layer including the cambium. This intermediate layer has a slippery characteristic so that the bark can be slid off the tree if the tree shaker exerts high shear forces on it. It is particularly desirable that no forces be applied to the tree which exceed the resisting ability of the cambium layer so that the bark is not disengaged from the tree.

SUMMARY OF THE INVENTION

It is a general object of the present invention to provide an improved tree shaking apparatus particularly with respect to the prevention of damage to trees as by bark removal while nevertheless permitting a complete, firm grasp of the tree for efficient and thorough shaking thereof.

Another object of the invention is to provide tree shaking apparatus which permits the simultaneous application of reciprocatory and gyratory shaking forces to the tree but which does not permit such forces to exceed a predetermined value less than that which would cause yielding of the intermediate layer of the tree between the bark and the wood.

Another object of the invention is to provide apparatus of the above character which provides for controlled engagement of the tree by a hooking mechanism which engages the tree over a wide area so as to spread the forces imparted in the shaking of the tree over a wide portion thereof.

Additional objects and advantages of the invention will appear from the following description in which the preferred embodiment has been set forth in conjunction with the accompanying drawings.

In accordance with the above objects there is provided a tree shaking apparatus including a hooking mechanism sufficiently large to grasp a member of the tree. The hooking mechanism is suspended from a tractor on an elevatable boom and is driven in shaking relationship to the tree by a shaking mechanism carried by the boom. The hooking member includes clamp members for grasping the tree member and at least one pad mounted to the clamp so as to be interposed between the clamp member and the tree. A flexible apron overlies the pad on the tree engaging side and forming a slippery coating is applied between the apron and the pad. The clamp member is adapted to engage the tree for shaking the same, but, whenever the shear force imparted thereby tends to exceed a given value less than that which would cause yielding of the intermediate layer between the bark and the wood, the pad and apron slip with respect to each other. The shape of the pad is preformed and adapted to key to the tree so that a large area of contact between the pad and the tree is obtained.

DESCRIPTION OF THE DRAWINGS

FIGURE 1 is a side elevational view of a tree shaking apparatus incorporating the present invention as showing the same engaging a tree.

FIGURE 2 is an enlarged top plan view of the hooking and shaking mechanism employed with the apparatus of FIGURE 1 taken generally along the lines 2—2 thereof.

FIGURE 3 is a cross sectional view taken along the lines 3—3 of FIGURE 2.

FIGURE 4 is a side elevational view partly in cross section showing in detail the engagement of the hooking mechanism with the tree.

DETAILED DESCRIPTION

Figures 5, 6:
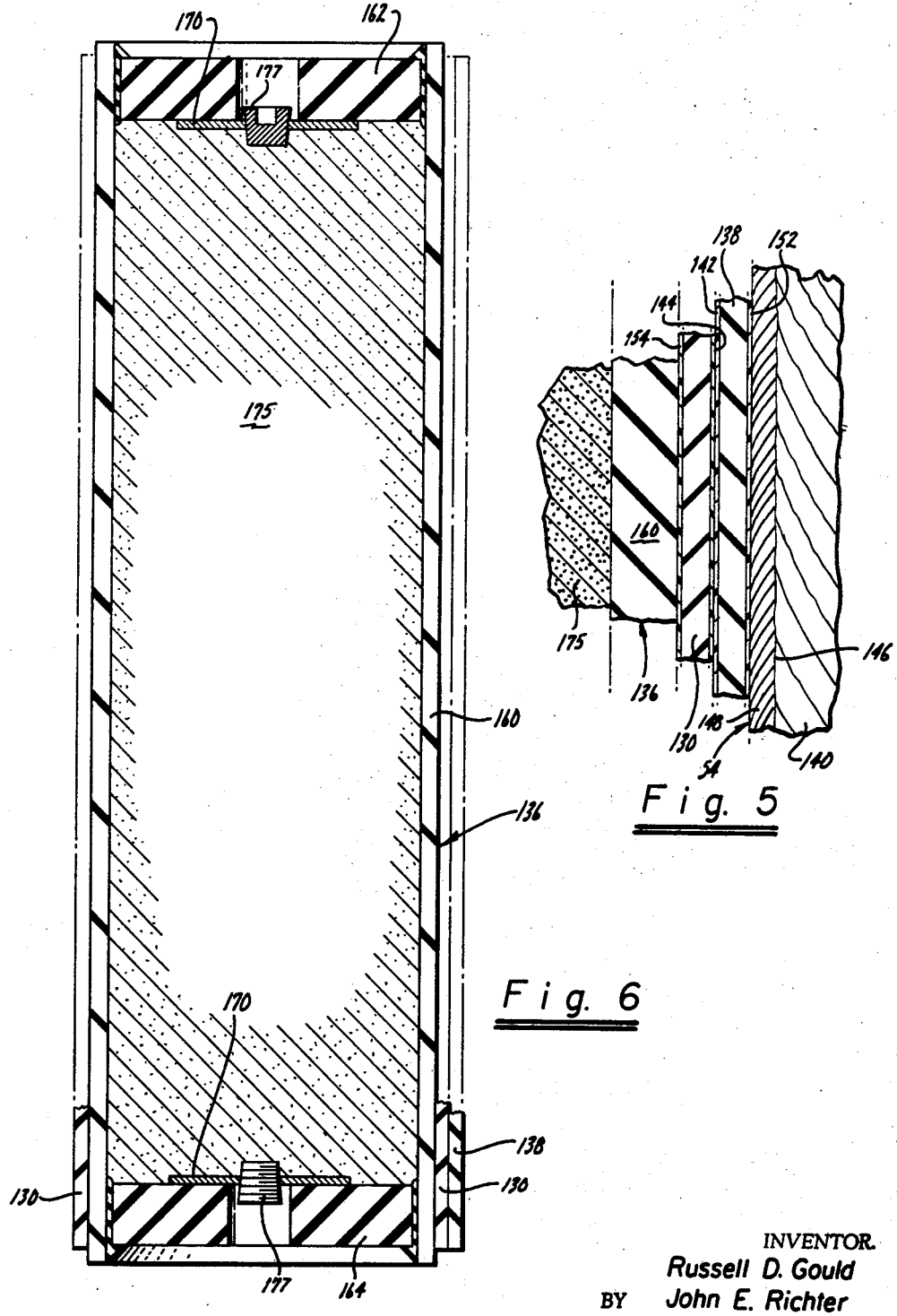
FIGURE 5 is an enlarged cross sectional view taken along the lines 5—5 of FIGURE 4.
FIGURE 6 is a cross sectional view of a portion of the hooking mechanism taken along the lines 6—6 of FIGURE 4.

Referring to FIGURES 1 and 2, there is shown tree shaking apparatus constructed according to the invention and consisting of a frame 10 supported on wheels 12 driven by a motor 14 and controlled by a steering mechanism 16. Upstanding brackets 20 are secured at one end of frame 10 and carry a boom 22 pivotally secured thereto by pin means 24. Boom 22 is elevated and held in position by the action of a hydraulic cylinder 26 pivotally secured between one end of frame 10 and an intermediate position on boom 22.

The mechanisms for elevating the boom and for aligning, operating and shaking the hooking mechanism, as hereinafter described, all derive power from a hydraulic pump 28 mounted on frame 10 and operated by a drive shaft 30 driven by a motor 14. The hydraulic pump is connected to reservoir 32 of hydraulic fluid and supplies such fluid under pressure to suitable conduits (not shown) to control valve means 34 which diverts the hydraulic fluid to the various mechanisms of the apparatus to control the boom alignment and hooking and shaking operations.

An alignment frame 36 is pivotally mounted on the outward end of boom 22 and includes spaced apart side supports 38, 40 interconnected and supported on a pivot shaft 46 received in a bearing 48 carried by the outer end of boom 22. A hydraulic linear actuator 50 is pivotally connected between boom 22 and a crank lever 52 non-rotatably secured to shaft 46 to rotate the frame 36 about its axis. Thus, it will be understood that operation of the actuators 26 and 50 moves the boom 22 and the alignment frame 36 into any desired position of alignment with respect to a tree member 54 as the position of the horizontal alignment shown.

A shaking mechanism 56 is carried in alignment frame 36 on four suspension mounts 58. Shaking mechanism 58 consists of a housing 60 including spaced transverse cross frame members 62, 63. Suspension mounts 58 include bolts 64 flexibly connected through rubber bushings 66 at their upper ends to depend from brackets 68 affixed to arms 38, 40 and flexibly connected through rubber bushings 70 to the ends cross frame members 62, 63. In general, the suspension mounts 58 permit free inertial movement of the shaking mechanism during tree shaking operation. It will be appreciated, however, that the invention herein is not limited to such structure but may be utilized in connection with any of the type of shaking mechanism including the inertial shakers, purely reciprocal shakers, ground supported shakers and the like. In the embodiment shown herein, the shaking mechanism comprises a system of rotating eccentric weights 72, 74 mounted within the housing and suspended in bearings 76, 78. A hydraulic motor 80 connected to the weights by a drive chain 82 rotates then in timed relationship and in opposite senses.

Referring to FIGURES 2 through 4, the hooking mechanism 84 of the invention takes the form of an adjustable C-clamp of a scale large enough to grasp a tree member with authority. Hooking mechanism 84 comprises opposed clamping members 86, 88 carried at the outward end of the shaker housing 60. Clamp member 86 is secured to a transverse leg 90 of an L-shaped frame 92 which is slidably mounted alongside of the shaker housing by means of a guideway 94, follower 96 set in the guideway, and slot 98. The frame 92 is driven back and forth by a hydraulic linear actuator 100 pivotally connected to a bracket 102 mounted to the rear end of housing 66 and to a lever arm 109 affixed to the rear of frame 92. Further details of this mechanism are not required for an understanding of this invention and, accordingly, will be omitted. The patent application referenced above may be consulted for such details.

Clamping member 88 consists of flat plate 106 having an upper edge 108 bent away from the tree 54. A channel member 110 is welded to the rear of the plate 106 to support the same and carries a bearing 112 adapted to be supported on a pin 114 carried between brackets 116 attached to the outer end of housing 66. Channel member 110 has a flat rear portion 118 which abuts a spacing block 120 interposed between it and the housing 66 to support member 88 in a generally vertical alignment. The above arrangement facilitates the removal and replacement of member 88.

Each of clamp members 86, 88 carries a tree engaging clamping pad assembly which is shown in detail in FIGURES 4 through 6. Each clamping pad assembly is identical so that like parts will be given a single number and described but once, the description being taken as referring to both. Thus, a pad carrying sling 130 is fastened to each of clamp members 86, 88 along upper edges 87, 108 thereof by screws 132 passed through a holding bar 134. Each sling 130 is made of flexible webbing such as a length of four-ply fiber-reinforced (nylon) conveyer belting formed into a horizontally extending open loop, the ends of which are clamped between bar 134 and the respective edges 87, 108. Each loop receives and supports a cylindrical resilient pad 136, as hereinafter described, the pad substantially filling the loop. Pad 136 has an elliptical lateral cross section, the broad faces of which face the tree 54 and the respective one of members 86, 88.

In general, a ratio of minor to major axes of about 1:2 is found satisfactory.

An apron 138 of flexible material such as a length of conveyor belting, is suspended to overlie and depends downwardly in front of the tree engaging side of the pad and sling, as shown in FIGURE 3. Preferably, apron 138 is formed into an open loop 140 at its upper end which is held in place by bar 134 together with the ends of sling 130. In this way, limited relative movement of the apron with respect to the pad and sling can take place, the movement being accommodated up by the flexible support provided by loop 140.

Referring especially to FIGURE 5, each of the surfaces of the support loop and the apron includes a substance having a low coefficient of friction so that when sufficient shear force is exerted, it will permit the apron and the sling to slide past each other. Preferably, such substance comprises solid lubricant coatings 142, 144 of a fluorocarbon polymer such as polytetrafluoroethylene which may be applied thereto by any suitable means such as by spraying a suspension of the fluorocarbon polymer in a suitable vehicle. Suitable sprays are available commercially under the name Sebcoat No. 617-23B, Industrial Lubricant, manufactured by Sebco Inc., P.O. Box 397, Moline, Ill. Another suitable spray is that manufactured by Spray-On Products, Inc., Industrial Supply Division, Bedford Heights, Ohio. In general, the coefficient of friction of the lubricant coating serves to set a limit to the shear forces that can be applied to the tree for a given clamp pressure and surface area of contact between the apron and the sling. In general, shear forces can be applied to the tree up to a limit which is less than that which would cause the intermediate layer 146 between the bark 148 and the wood 140 to yield.

There also exists a tendency for the shaking and hooking mechanism to ride-up or shift upwardly during the shaking operation, probably due to the decrease in resistance to motion presented by portions of the tree more remote from the base point of support. This tendency to ride-up can also exert considerable shear force on the tree which is limited by this invention since the apron and sling will slide by each other when the force exceeds the limit set by the coefficient of friction. Relative motion between the apron and the sling is accommodated by the collapse of loop 140 so that no binding of the apron occurs. For convenience of manufacture the remaining surfaces of apron 138 and sling 130 can also be provided with substantially nonoperational lubricant coatings 152, 154.

The construction of resilient pad 136 of the invention is shown in detail in FIGURE 6. Pad 136 comprises cylindrical length of tubing 160 which has been processed in final curing into an oval or ellipsoidal form in lateral cross section. The ends of the tubing are closed with planar end pieces 162, 164 made of rubber having an elliptical form corresponding to the inside shape of tubing 160 and secured in place by rubber cement 166. A fill hole 168 is formed through each of the end pieces 162, 164 and is closed off by a metal plate 170 cemented to the inside of each resilient end piece. A removable plug 177 threadedly engages a hole in plate 120 and serves to retain packed sand 170 within the pad. Important features of the pads 136 include their formation into an elliptical or oval shape in lateral section and the manner of mounting them. The sling mounting permits the pad to be easily and quickly positioned within the loop of the sling so that the one broad side thereof is in contact with the face of a clamp member and the other broad side is facing toward the opposing pad and ready to engage a substantial surface of contact between itself and the tree. Each pad is easily removed for refilling with sand necessitated by its wearing out. It is desired to use sand because it tends to yield slightly and key into the shape of the tree as the clamping pressure is increased, after which shear forces, torques, and the like are evenly transmitted to the tree due to the large area presented by the broad face of the pad. And, any tendency for the pad to roll across the surface of the support plate is effectively countered by the elliptical shape.

Figure 7:
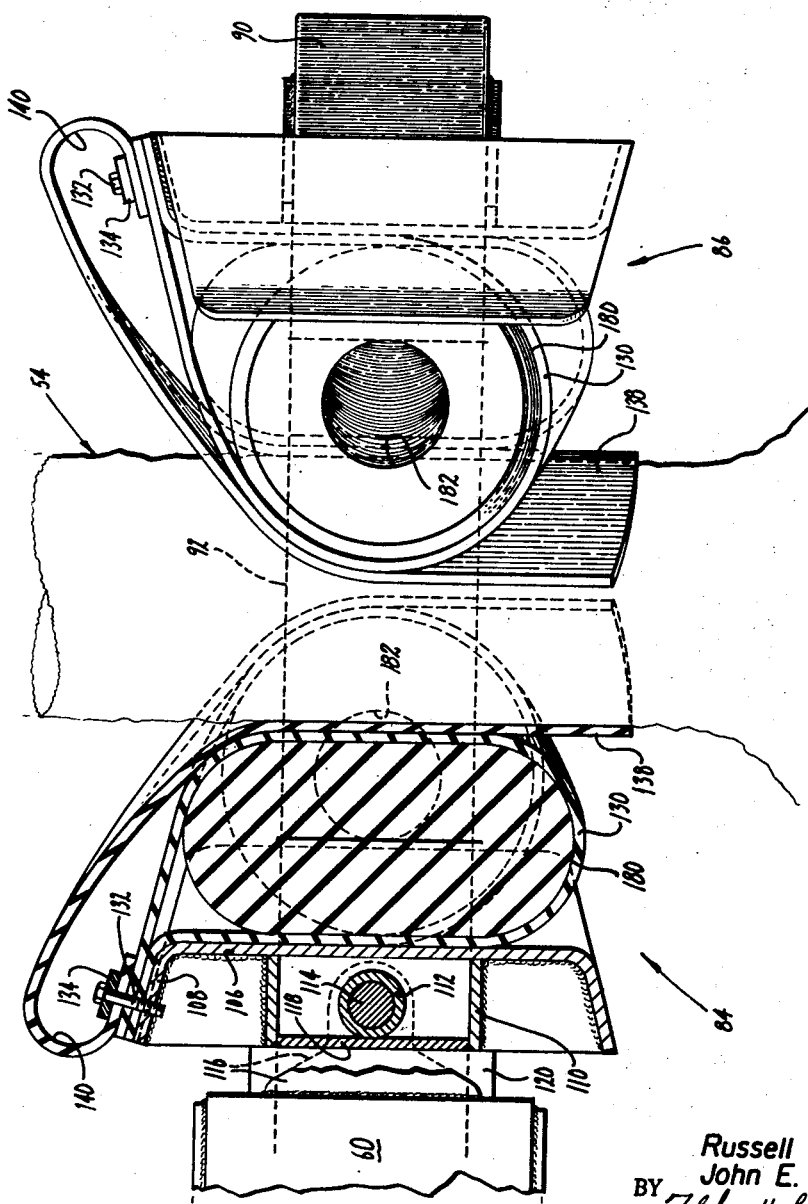
FIGURE 7 is a side elevational view partly in cross section and partially broken away of another embodiment of the invention.

FIGURE 7 shows an alternate form of the invention in which a donut type pad 180 generally similar to the type disclosed in United States Patent No. 3,020,695 (issued Feb. 13, 1962 to Gould et al.) is used in place of the sand filled pad 136. Pad 180 is shaped in the form of a hollow cyinder having thick elastomer walls surrounding a hollow region 182 which collapses in operation. Aside from substitution of pad 180 for pad 136, the remaining parts shown in FIGURE 7 are the same as previously described in connection with FIGURES 1 through 6 and have been given like numbers insofar as they have been repeated. The operation of the apparatus of FIGURE 7 is generally the same as that of FIGURES 1 through 6 except that as the tree is grasped the hollow region is deformed until the cylinder is collapsed and generally conforms to the shape of the tree. Under some circumstances, substitution of pad 180 for the sand filled pad 136 has been found desirable especially where the cost and inconvenience of replacing the sand is a factor.

From the foregoing it will be apparent that the tree shaking apparatus disclosed herein will be of great value in preventing damage to trees in large scale nut and fruit harvesting operations. The invention solved the serious problem regarding loosening of bark because of the exertion too great a shear force. The invention herein is easily adapted to a wide variety of equipment and can be used as a replacement part to improve existing tree shakers. In the typical operation, clamping forces of the order of 10,000 pounds have been applied to a pad assembly wherein the surface area of contact with the tree of approximately 264 square inches and no significant damage resulted from applying significant gyratory and reciprocatory shaking motions to the tree.

To those skilled in the art to which this invention relates many changes in construction and widely different embodiments and applications of the invention will suggest themselves without departing from its spirit and scope. For example, instead of using a sling for mounting the resilient pad, it may be mounted by other suitable means, and the surfaces of contact between the apron and the pad are provided with a lubricant coating, and, while two types of pad are shown and described herein, other forms can be substituted without departing from the invention. Accordingly, it should be understood that the description and disclosures contained herein are illustrative and are not intended to be taken as a limitation on the invention.

We claim:

1. In tree shaking apparatus of the type applying a suspended hooking mechanism having opposed clamp members for grasping a tree member and transmitting a shaking action thereto, at least one pad assembly including a pad and means for mounting said pad to one of said clamp members so that the pad is interposed between the clamp member and the tree member to be shaken, a flexible apron, means mounting said apron to overlie the pad assembly on the side away from the clamp member to which it is mounted, the surfaces of contact between the apron and pad assembly having a coefficient of friction sufficiently low that said surfaces of contact slide with respect to each other whenever the shear forces imparted in a tree shaking operation exceed a given value less than that which would cause yielding of the intermediate layer of the tree member between the bark and the wood.

2. Tree shaking apparatus as in claim 1 wherein said surfaces of contact between the pad assembly and the apron are provided with a lubricant coating.

3. Tree shaking apparatus as in claim 2 wherein said coating is a solid.

4. Tree shaking apparatus as in claim 3 in which said coating includes a layer of fluorocarbon polymer applied to the surfaces of contact between the apron and the pad.

5. A tree shaking apparatus as in claim 4 wherein said fluorocarbon polymer is polytetrafluoroethylene.

6. Tree shaking apparatus as in claim 1 further including means for mounting said apron in a freely depending relationship overlying the pad assembly, said means having a low resistance to motion of said apron in any direction with respect to the pad assembly.

7. Tree shaking apparatus as in claim 6 in which said means mounting said apron comprises an extension of said apron formed into a loop and secured to the associated clamp members so that said apron is free for limited movement in any direction with respect to said pad.

8. Tree shaking apparatus as in claim 1 wherein both clamp members are provided with pad assemblies and aprons.

9. Tree shaking apparatus as in claim 1 wherein said pad is in the form of a cylinder having an oval cross section, the less contoured portion of said cylinder being presented toward said tree.

10. Tree shaking apparatus as in claim 1 in which said means mounting said pad to said clamp member includes a sling of flexible webbing, the ends of said sling being attached to an upper portion of said clamp member so that the sling forms a downwardly depending loop for carrying said pad.

11. Tree shaking apparatus as in claim 7 wherein said sling and said apron are each provided with a lubricant coating.

12. Tree shaking apparatus as in claim 1 wherein said pad comprises a generally flexible cylindrical tube having an elliptical cross section, means closing said tube, a packing of sand disposed within the tube, and means supporting said pad so that one broad face is positioned to face the tree member.

References Cited

UNITED STATES PATENTS 3,318,629   5/1967   Brandt _____ 294—103

HARVEY C. HORNSBY, Primary Examiner